United States Patent

[11] 3,634,667

[72] Inventors: Kiyokazu Okamoto;
Masayuki Miyazaki, both of Tokyo, Japan
[21] Appl. No.: 32,094
[22] Filed: Apr. 27, 1970
[45] Patented: Jan. 11, 1972
[73] Assignee: Nippon Electric Company, Limited
Tokyo, Japan
[32] Priority: Dec. 21, 1965
[33] Japan
[31] 40/78771

[54] DIGITAL INTERPOLATOR
9 Claims, 19 Drawing Figs.

[52] U.S. Cl................................................ 235/152,
318/573
[51] Int. Cl........................................................G05b 19/24
[50] Field of Search..........................................235/151.11,
152

[56] References Cited
UNITED STATES PATENTS
3,544,972  12/1970  Trousdale.................... 235/151.11

Primary Examiner—Eugene G. Botz
Assistant Examiner—R. Stephen Dildine, Jr.

ABSTRACT: A two dimensional curve $f(x, y)=0$ to be followed up or reproduced is replaced with at least one straight line segment and/or circular arc. Supplied with the data defining the kind of the replacement and the sense of followup and representing the coordinates of the start and end points of the followup the interpolator discriminates the minimum of those absolute values of $f(x, y)$ wherein the coordinates of the possible next followup points are substituted for the variables. The interpolator, thus, determines the coordinates of the next succeeding followup point.

INVENTORS
KIYOKAZU OKAMOTO
MASAYUKI MIYAZAKI

INVENTORS
KIYOKAZU OKAMOTO
MASAYUKI MIYAZAKI

DIGITAL INTERPOLATOR

CROSS-REFERENCE TO RELATED APPLICATION

This is a continuation-in-part of our copending application Serial No. 603,312 entitled "Digital Interpolator" and filed Dec. 20, 1966 and now abandoned.

BACKGROUND OF THE INVENTION

This invention relates to a digital interpolator for following up or tracing a desired two- or three-dimensional curve. Such an interpolator is applicable to numerically controlled machines such as numerically controlled drafting or milling machines. The curve may include one or more rectilinear portions or may be a straight line segment or a polygonal line.

Inasmuch as the interpolator of the kind deals with digital information, it is possible to give the coordinates of the curve with integers of restricted digits or, in other words, to quantize the coordinates. The points on a plane or in a space with quantized coordinates will hereinafter be called the lattice points. It is already the practice to select a length of from 0.001 mm. to 0.01 mm. as the unit of quantization. With this unit, it is already known that the radius of curvature of the desired curve seldom descends from 50, except at some singular points, if any, on the curve where the equation or equations for the curve is not differentiable. It is also known that a curve segment or block having no such singular points can be replaced either with a straight line segment as a first approximation or with a circular arc as a second approximation.

SUMMARY OF THE INVENTION

It is an object of this invention to provide a digital interpolator which is simpler in construction than conventional interpolators.

Another object is to provide a digital interpolator which best approximates a desired curve with a given unit of quantization.

Still another object is to provide a digital interpolator capable of performing high-speed operation as compared to conventional interpolators with given precision of tracing or followup.

A specific object is to provide a digital interpolator for deriving the coordinates of successive actual followup points whose maximum deviation from the desired curve is $1/\sqrt{2}$ or one-half of the quantized unit.

Another specific object is to provide a digital interpolator operable at a contouring speed increased by as much as $\sqrt{2}$ or 2 times the conventional contouring speed without sacrificing the degree of approximation.

According to this invention, the desired curve $f(x, y)=0$ is divided into curve segments, each segment being replaceable with a replacement in the form of a straight line segment or a circular arc which is to be traced from one end to other. The division may be coarse or fine according to the desired precision except that the division is mandatory at the singular points, if any. It should be noted here that it is possible with sufficient precision to assign the quantized coordinates to the start points and the end points of tracing.

The interpolator of the invention is supplied with the data defining the kind of the curve replacements, the sense of tracing along the respective replacements, and the coordinates of the start and the end points. The information may be given to the interpolator by manual operation of a keyboard or by means of a recording medium and a reading device therefor.

As will readily be seen, the replacement may be the curve segment itself in some cases. The deviation as designated herein is the length of that normal to the curve which passes through the possible followup point. Permissible directions or permissible step directions as designated hereafter are those discrete directions with sense, such as $+x$ and $+y$ with or without addition of the diagonal, into which the tracing may take place.

Possible selection points, as named herein, are the lattice points placed adjacent to the present followup point in the permissible directions.

Supplied with the data, the interpolator determines which of the possible followup points has the minimum deviation from the curve by comparing the absolute values of $f(x, y)$ where the coordinates of the possible followup points are substituted for the variables.

Based on this determination, the interpolator delivers for each actual followup point the incremental signal which, when added to the coordinates of the actual followup point, gives the coordinates of the next subsequent followup point.

The incremental signals may be used to drive directly a digital servosystem such as a stepping motor. Alternatively, these signals may be recorded on a recording medium for operating a machine such as a digital servosystem.

The operation of the interpolator according to the invention is characterized by the use of the deviations, which are quantitative information, in lieu of conventional qualitative information indicative of whether the present followup point is in the positive or the negative region of the curve being traced.

Consequently, the maximum deviation is $1/\sqrt{2}$ of the quantization unit with two permissible directions of the orthogonal coordinates and one-half of the unit with the diagonal added to the two permissible directions. Yet, the interpolator is no more complex than the conventional ones because the absolute values of $f(x, y)$ with the substitution of the coordinates of the next possible followup points for the variables are utilized as the quantitative information in lieu of the deviations themselves, the square roots of the respective deviations, the exponentials of the deviations, and the like monotonic functions of the deviations.

DESCRIPTION OF THE PREFERRED EMBODIMENTS

Figure 1:
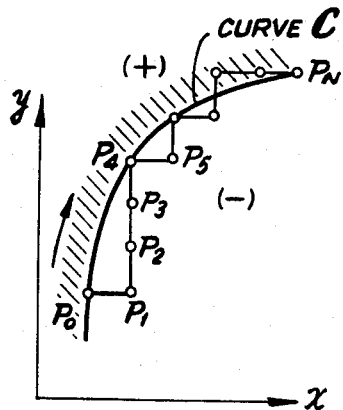
FIGS. 1 and 2 show the principles of operation of a conventional digital interpolator.
Figure 2:
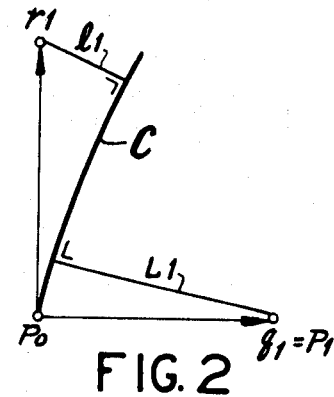

Before describing the preferred embodiments, FIGS. 1 and 2 will be referred to in order to explain a conventional interpolator such as that disclosed in an article entitled 'A Study on Numerical Contouring System for Machine Tools Based on Algebraic Mathematic Type Interpolator and Electrohydraulic Pulse Motor' printed in "Fujitsu Scientific and Technical Journal," Vol. 1, No. 2, pp.1–49, published 1966. In tracing a circular arc C in the sense given by the arrow, the outside and the inside of the curve arc are respectively taken as positive and negative regions (or vice versa) with the curve as the boundary (which may be included in either region and has for convenience been assumed to be in the positive region). The direction $x$ or $y$ of the trace in which a step should be taken from the present followup point $p_n$ is determined depending upon whether the point $p_n$ is in the positive or the negative region. For example, the $+x$ direction is selected out of the permissible directions $+x$ and $+y$ for the present followup point $p_o$ and the like placed in the positive region. The $+y$ direction is selected for the present followup point $p_1$, $p_2$, $p_3$, or $p_5$ situated in the negative region. In this manner, the curve is approximated with deviations less than one quantization unit. It is to be noted, however, that where a step has been taken from the previous followup point $p_o$ to the present one $p_1$ among the possible next followup points $q_1$ and $r_1$ as exemplified in the partial enlarged view of FIG. 2, the deviation $L_1$ of the present followup point $p_1$ from the curve is greater than the deviation $l_1$ of the other possible followup point $r_1$. This shows that the tracing is not always preformed to minimize the deviation.

Figure 3:
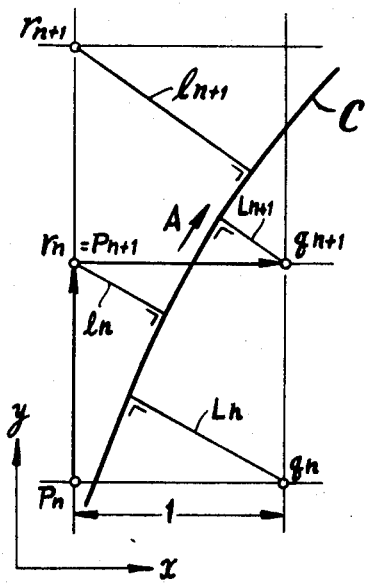
FIGS. 3, 4 and 5 show the principles of interpolation according to the invention.

Referring to FIG. 3, a circular arc C is traced in the sense represented by an arrow A with the steps being taken from a present followup point $p_n$ to the selected one of two possible next followup points $q_n$ and $r_n$. The next actual followup point $p_{n+1}$ is selected in such a manner that the deviation $l_n$ thereof from the curve may be smaller than the deviation $L_n$ of the other possible followup point $q_n$. The next step proceeds from the present followup point $p_{+1}$ to that one of the possible followup points $q_{n+1}$ and $r_{n+1}$ which has the minimum of the deviations $L_{n+1}$ and $l_{n+1}$.

Figure 4:
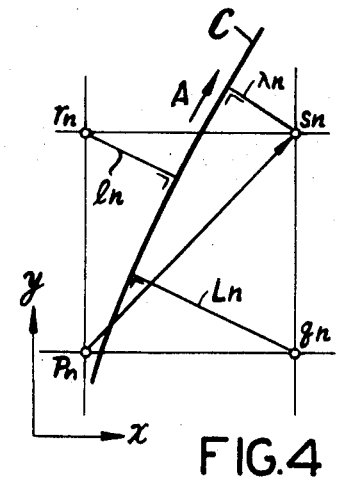

Referring to FIG. 4, a circular arc C is similarly traced with the step being taken to that selected one of the possible followup points $q_n$, $r_n$, and $s_n$ which has the minimum of the deviations $L_n$, $l_n$, and $\lambda_n$ of the three respective points $q_n$, $r_n$, and $s_n$ from the curve. In other words, the permissible directions of the step are the $+x$, the $+y$, and diagonal directions.

In case two or more of such deviations are equal, the step may be forwarded to either of the two or more directions. It is possible in such a case to select, for example, the $+x$ direction.

Figure 5:
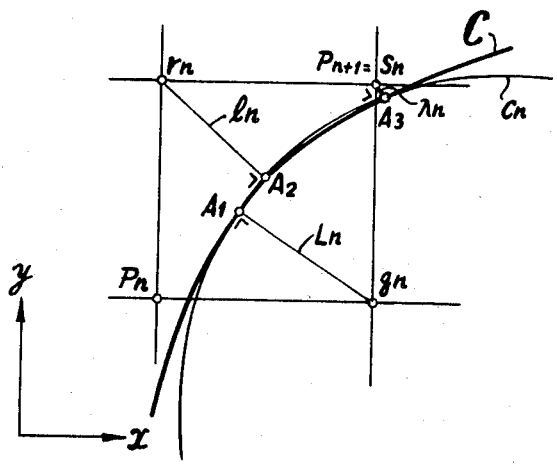

Referring to FIG. 5, a curve C to be traced is approximated in the vicinity of the $n$th followup point $p_n$ with a replacement circular arc $C_{cn}$ (the curvature is exaggerated). Let the coordinates of the present followup point $p_n$ and the two possible next followup points $q_n$ and $r_n$ in the case of two step directions and the additional possible followup point $s_n$ in the case of these step directions be $(x_i, y_j)$, $(x_{i+1}, y_j)$, $(x_i, y_{j+1})$, and $(x_{i+1}, y_{j+1})$, respectively, while the coordinates of the intersections $A_1$, $A_2$, and $A_3$ of the curve with the normals passing through the respective possible followup points $q_n$, $r_n$, and $s_n$ be $(x_1, y_1)$, $(x_2, y_2)$, and $(x_3, y_3)$, respectively. The replacement circular arc $C_{cn}$ is a portion of the circle passing through the feet $A_1$, $A_2$, and $A_3$. Let the curve and the replacement be expressed by:

$$f(x, y) = 0 \quad (1)$$

and $$f_{cn}(x, y) = 0, \quad (2)$$

respectively. Inasmuch as the equation (2) represents the circumference of a circle, $$|\text{grad} f_{cn}(x_1, y_1)| = |\text{grad} f_{cn}(x_2, y_2)|$$
$$= |\text{grad} f_{cn}(x_3, y_3)| \quad (3)$$

Inasmuch as the equation (1) is approximated by equation (2), $$|\text{grad} f(x_1, y_1)| \cong |\text{grad} f_{cn}(x_1, y_1)| \quad (4)$$

and so on. Accordingly, $$|\text{grad} f(x_1, y_1)| \cong |\text{grad} f(x_2, y_2)| \cong |\text{grad} f(x_3, y_3)| \quad (5)$$

Inasmuch as the points $q_n$, $r_n$, and $s_n$ exist near the intersections $A_1$, $A_2$, and $A_3$, respectively, $$|f(x_{i+1}, y_j)| = |\text{grad} f(x_1, y_1)| \cdot L_n + R_1, \quad (6)$$
$$|f(x_i, y_{j+1})| = |\text{grad} f(x_2, y_2)| \cdot l_n + R_2, \quad (7)$$

and $$|f(x_{i+1}, y_{j+1})| = |\text{grad} f(x_3, y_3)| \cdot \lambda_n + R_3, \quad (8)$$

where $L_n$, $l_n$, and $\lambda_n$ are the deviations for the points $q_n$, $r_n$, and $s_n$, respectively, and $R_1$, $R_2$, and $R_3$ are the residuals of the order of $L_n^2$, namely, less than the quantization unit. If the radius of the replacement circle is R, $|\text{grad} f_{cn}(x, y)|$ is equal to $2R$ and is about 100 times as great as the quantization unit. It is therefore possible to neglect the second terms of the righthand sides of the equations (6), (7), and (8). Equations (5) show that the first factors of the right-hand sides of the equations (6), (7), and (8) are approximately equal constants. In addition, a straight line can be deemed to be the circumference of a circle having an infinitely large radius. After all, $|f(x,Y)|$ is a monotonous increasing function of the deviations where $f(x, y)$ is differentiable. Consequently, it is now found that comparison of $|f(x_{i+1}, y_j)|$, $|f(x_i, y_{j+1})|$, and $|f(x_{i+1}, y_{j+1})|$ can be substituted for comparison of the deviations $L_n$, $l_n$, and $\lambda_n$.

Figure 6:
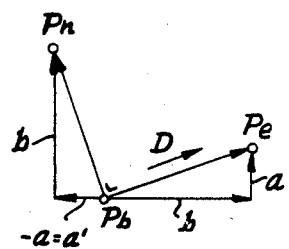
FIGS. 6, 7 and 8 show the data to be supplied to the interpolator of this invention.

Referring to FIG. 6, the information relating to the kind of the curve (a straight line segment) and the sense of tracing is given by a single character, such as D, in this case. For simplicity, the origin of the coordinates is set at the start point $P_b$. The coordinates of the end point $P_e$ are $(b, a)$. The equation for the desired curve is $$f(x, y) = a'x + by = 0 \quad (9)$$

where $a' = -a$. Equation (9) demonstrates that a vector $\overrightarrow{P_b P_n}$ with components $a'$ and $b$ is orthogonal to the curve at any point $(x, y)$ in the curve. In case the step is to be forwarded along the $x$ and the $y$ axes, the permissible directions are given by the signs of the components of the normal vector as follows:

| a' | b | permissible directions |
|---|---|---|
| + | + | $+x$ and $-y$ |
| + | − | $-x$ and $-y$ |
| − | − | $-x$ and $+y$ |
| − | + | $+x$ and $+y$. |

If the step can be forwarded also along the diagonal, the additional permissible direction is along the diagonal determined by the permissible $x$ and $y$ directions given above.

Figure 7:
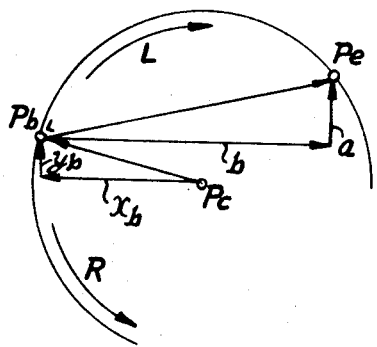

Referring to FIG. 7, the information defining the kinds of the curve (a circular arc) and the sense of trace is given by a single character, such as L or R, according as the arc should be traced clockwise or counterclockwise. For simplicity, the origin of the coordinates may be set at the center $P_c$ of the circle. The coordinates of the start and the end points $P_b$ and $P_e$ are, for example, $(x_b, y_b)$ and $(b, a)$. The equation for the desired curve is $$f(x, y) = x^2 + y^2 - (x_b^2 + y_b^2) = 0 \quad (10)$$

Therefore, a vector $(x, y)$ is the normal vector for the curve at an arbitrary point $(x, y)$ on the curve. Inasmuch as the deviation of a followup point from the curve is $1/\sqrt{2}$ of the quantization unit at most according to the invention, the normal vector $(x, y)$ can be approximated by a vector $(x_i, y_j)$ with sufficient precision. An approximation vector $(x_i, y_j)$ may be called a pseudonormal vector (which is also applicable to the case of tracing a straight line segment). The permissible directions, with the addition of the diagonal if such is the case, are given with reference signs of the components of the pseudonormal vector as follows:

| $x_i$ | $y_j$ | permissible directions for L | | for R | |
|---|---|---|---|---|---|
| + | + | $+x$ | $-y$ | $-x$ | $+y$ |
| + | − | $-x +x$ | $-y$ | | $+y$ |
| − | − | $-x$ | $+y$ | $+x$ | $-y$ |
| − | + | | | $+x$ $+y$ | $-x$ $-y$. |

Figure 8:
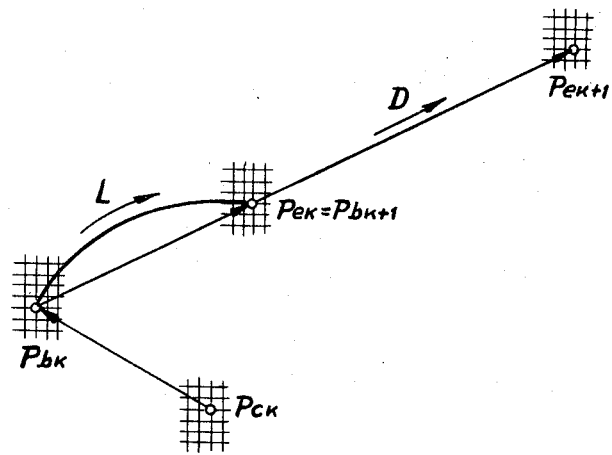

Referring to FIG. 8, a portion of the desired curve is divided into a clockwise circular arc and straight line segments represented by L and D, respectively, together with the senses of trace. Let it be assumed that the arc and the line segments are the $k$-th and the $(k+1)$-th blocks of the desired curve, respectively. The end points $P_{e_{k-1}}$ and $P_{e_k}$ of the $(k-1)$-th and the $k$-th blocks are the start points $P_{b_k}$ and $P_{b_{k+1}}$ of the $k$-th and the $(k+1)$-th blocks, respectively. The coordinate origins for the respective blocks are the center $P_{c_k}$ for the circular arc and the start point $P_{b_{k+1}}$ for the line segment. With sufficient approximation, it is possible to assign the quantitized coordinates to start and the end points for a circular arc and to the end point of a line segment.

The data are supplied to the interpolator, segment after segment. More particularly, the data for the $k$-th block are reset when the end point $P_{e_k}$ is reached. At this moment the supply of the data for the next block begins.

It is preferred to carry out the comparison between, for example, $|f(x_i, y_{j+1})|$ and $|f(x_{i+1}, y_j)|$ by $E_0 = |f(x_i, y_{j+1})|^2$
$$- |f(x_{i+1}, y_j)|^2 \quad (11)$$

Equation (11) may be rewritten into $$E_0 = 4E_1 \cdot E_2, \quad (12)$$

where $$E_1 = \tfrac{1}{2} \cdot \{f(x_i, y_{j+1}) - f(x_{i+1}, y_j)\} \quad (13)$$

and $$E_2 = \tfrac{1}{2} \cdot \{f(x_i, y_{j+1}) - f(x_i, y_j)\} \\ + \tfrac{1}{2} \cdot \{f(x_{i+1}, y_j) - f(x_i, y_j)\} + f(x_i, y_j) \quad (14)$$

If $E_1$ and $E_2$ have the same sign (including the case where either is zero), $$E_0 \geq 0,$$

namely, $$|f(x_i, y_{j+1})| \geq |f(x_{i+1}, y_j)|.$$

If $E_1$ and $E_2$ have the opposite signs, $$|f(x_i, y_{j+1})| < |f(x_{i+1}, y_j)|$$

In case the information defining the kind of the curve and the sense of followup is D, the straight line being denoted by equation (9), $$E_1 = \tfrac{1}{2} \cdot [\{a'x_i + b(y_j + d_2)\} - \{a'(x_i + d_1) + by_j\}]$$

or $$\left. \begin{array}{l} E_1 = \tfrac{1}{2} \cdot (|b| + |a'|) \text{ for } d_1 d_2 > 0 \\ \text{and} \\ E_1 = -\tfrac{1}{2} \cdot (|b| + |a'|) \text{ for } d_1 d_2 < 0 \end{array} \right\} \quad (15)$$

and $$E_2 = \tfrac{1}{2} \cdot (bd_2 + a'd_1) + f(x_i, y_j) \quad (16)$$

In case the information is L and R, the circular arc is denoted by equation (10), $$\left. \begin{array}{l} E_1 = |y_j| + |x_i| \quad \text{ for } d_1 d_2 < 0 \\ \text{or} \\ E_1 = -(|y_j| + |x_i|) \text{ for } d_1 d_2 > 0 \\ \text{and} \\ E_1 = -(|y_j| + |x_i|) \text{ for } d_1 d_2 < 0 \\ \text{or} \\ E_1 = |y_j| + |x_i|, \quad \text{ for } d_1 d_2 > 0 \end{array} \right\} \quad (17)$$

respectively, and $$E_2 \equiv 2E_2' = 2\{\tfrac{1}{2} \cdot (y_j d_2 + x_i d_1) + \tfrac{1}{2} \cdot f(x_i, y_j)\} \quad (18)$$

From equations (15) and (17), it is now understood that the sign $sE_1$ of $E_1$ is determined by the sign of the product $d_1 d_2$. In other words, the sign $sE_1$ is determined by logic operation of $D, L, R, d_1$ and $d_2$.

On the other hand, $E_2$ or $E_2'$ is a function of the follow-up point $(x_i, y_j)$. Their initial values are $$E_2(0, 0) = \tfrac{1}{2} \cdot (bd_2 + a'd_1) \text{ for } D \quad (16')$$

and $$E_2'(x_b, y_b) = \tfrac{1}{2} \cdot (y_b d_2 + x_b d_1) \text{ for L or R.} \quad (18')$$

For the subsequent follow-up points, $$\left. \begin{array}{l} E_2(x_i, y_{j+1}) = E_2(x_i, y_j) + \{E_2(x_i, y_{j+1}) - E_2(x_i, y_j)\} \\ \text{or} \\ E_2(x_{i+1}, y_j) = E_2(x_i, y_j) + \{E_2(x_{i+1}, y_j) - E_2(x_i, y_j)\} \end{array} \right\} \text{for D}$$

and $$\left. \begin{array}{l} E_2'(x_i, y_{j+1}) = E_2'(x_i, y_j) + \{E_2'(x_i, y_{j+1}) - E_2'(x_i, y_j)\} \\ \text{or} \\ E_2'(x_{i+1}, y_j) = E_2'(x_i, y_j) + \{E_2'(x_{i+1}, y_j) - E_2'(x_i, y_j)\} \end{array} \right\} \text{for L or R}$$

It is therefore possible to determine the sign $sE_2$ or $sE_2'$ by successively carrying out such addition.

More particularly, from equation (18) and from the facts that $$y_j + d_2(x_i, y_j) = y_{j+1}$$

and $$d_1(x_i, y_{j+1}) = d_1(x_i, y_j),$$

$$E_2'(x_i, y_{j+1}) - E_2'(x_i, y_j)$$
$$= \tfrac{1}{2} \cdot [\{y_{j+1} d_2(x_i, y_{j+1})\} \\ - \{y_{j+1} - d_2(x_i, y_j)\} \cdot d_2(x_i, y_j) \\ + x_i d_1(x_i, y_{j+1}) - x_i d_1(x_i, y_j) \\ + x_i^2 + y_{j+1}^2 \\ - \{x_i^2 + (y_{j+1} - d_2(x_i, y_j))^2\}]$$
$$= y_{j+1}/2 \cdot \{d_2(x_i, y_{j+1}) + d_2(x_i, y_j)\}. \quad (19)$$

Similarly $$E_2'(x_{i+1}, y_j) - E_2(x_i, y_j) = x_{i+1}/2 \cdot \{d_1(x_{i+1}, y_j) \\ + d_1(x_i, y_j)\} \quad (20)$$

From Equation 16 and the facts that $$d_1(x_i, y_{j+1}) = d_1(x_i, y_j)$$

and $$d_2(x_{i+1}, y_j) = d_2(x_i, y_j)$$

$$E_2(x_i, y_{j+1}) - E_2(x_i, y_j) = b/2 \cdot \{d_2(x_i, y_{j+1}) \\ + d_2(x_i, y_j)\} \quad (21)$$

and $$E_2(x_{i+1}, y_j) - E_2(x_i, y_j) = a'/2 \cdot \{d_1(x_{i+1}, y_j) \\ + d_1(x_i, y_j)\} \quad (22)$$

Therefore, it is possible to determine the sign $sE_2$ or $sE_2'$ by the same process for both a straight line and a circular arc. It should be understood that, during this determination, the components $(a', b)$ of the normal vector for the line segment undergoes no change in effect whereas those $(x_i, y_j)$ for the arc vary as the follow up proceeds.

Figure 9:
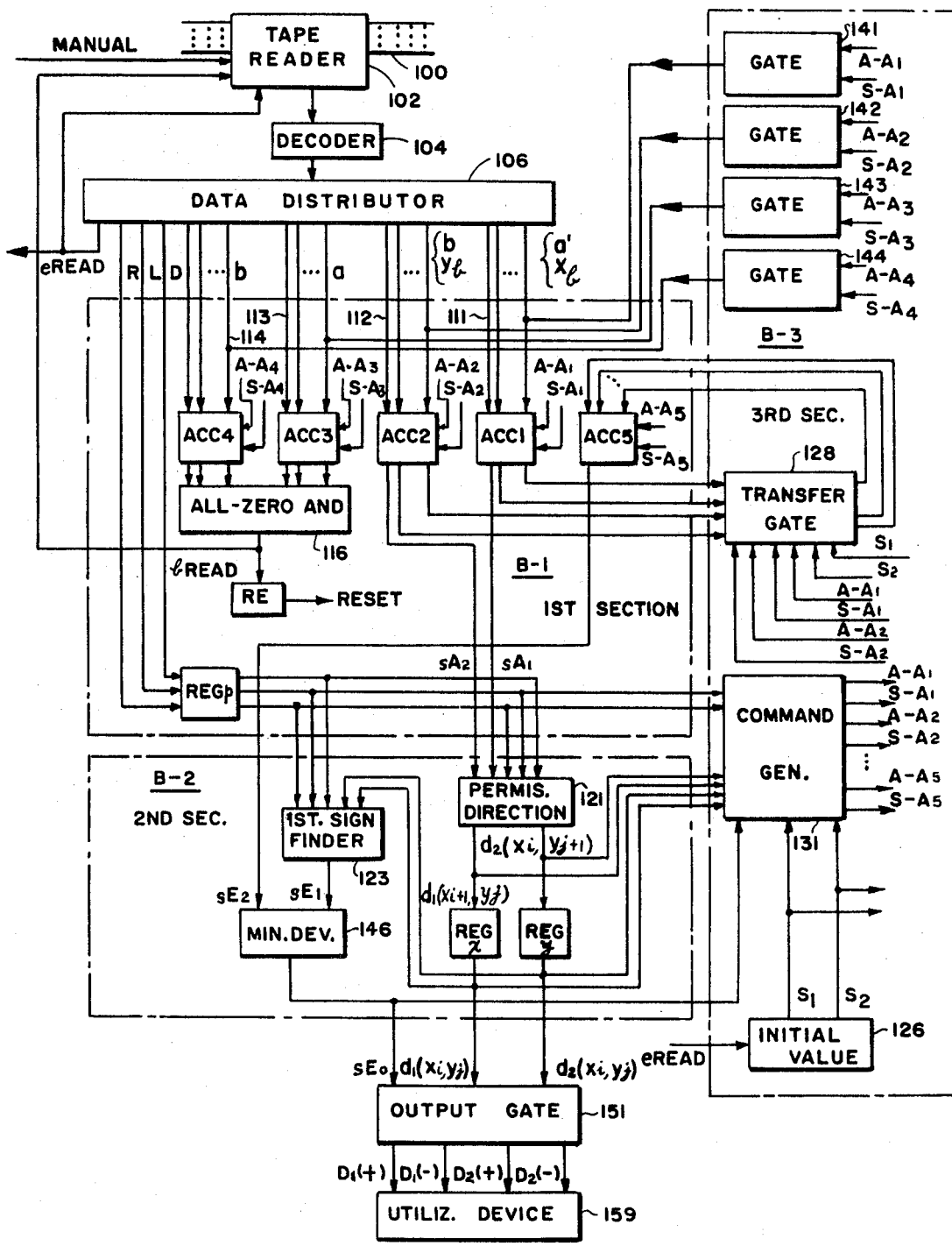
FIG. 9 is a schematic diagram of an embodiment of this invention.

Referring now to FIG. 9, it would be more convenient to describe the preferred manner of carrying out the followup according to the invention in conjunction with a specific example of the interpolator for two-step directions $x$ and $y$.

It is presumed that the information defining the whole curve (which may include one or more rectilinear portions or consist of rectilinear portions) to be traced is recorded, block after block, on a punched tape 100. The record of one block consists, if the curve portion is rectilinear in the relevant block, of the preparatory symbol D, the $x$ and the $y$ components $b$ and $a$ of the end point (the start point is the coordinate origin for the block), and an end of block symbol EOB and, if the curve portion is a circular arc, of the preparatory symbol L or R, the $x$ and the $y$ components $b$ and $a$ of the end point, the $x$ and the $y$ components $x_b$ and $y_b$ of the start point, and the end of block symbol EOB. The preparatory and the end of block symbols D, L, or R and EOB assume one character each, which may consist of 8 bits including a bit for the parity check. The record of the component $b$ further consists of a data symbol B of one character, a sign symbol + or − of one character, and numeric symbols of some characters. For example, a record of the $x$ component $b$ of the end point is B + 4 3 2 1 0 8. The records for the $y$ component $a$ of the end point and the $x$ and the $y$ components $x_b$ and $y_b$ of the start point for a circular arc are similar to the record of the $x$ component $b$ of the end point in format, the data symbols for the records $a$, $x_b$, and $y_b$ being A, X, and Y, respectively.

The input device comprises a known tape reader 102 which is triggered either manually or by a begin-read signal bREAD (to be later described) into the state of driving stepwise the tape 100 relative to the reader 102 and sensing the records, character after character, and triggered back by an end-read signal eREAD (to be later described) into the out-of-service state. The output of the reader 102 appears on eight leads as a combination of logical 1 and 0 signals corresponding to each character being sensed.

The input device further comprises a known decoder 104 having parallel EOB, D, L, R, B, A, X, Y, and sign symbol leads and 10 parallel numeric leads, all leads being depicted by a single line in the drawing. When supplied with a combination for a character of the end of block, the preparatory, the data, and the sign symbols from the reader 102, the decoder 104 produces a logical 1 signal on one of the symbol leads that is assigned to the symbol represented by the combination. Such logical 1 signals are herein called the EOB, D, L, R, B, A, X, Y, and sign signals. When supplied with a combination for a character of the numeric symbol, the decoder 104 produces a logical 1 signal on one of the numeric leads that is allotted to the one-digit number represented by the combination. Such logical 1 symbols produced successively for the coordinate component of a point is converted by a known pure binary converter (not shown) into bit-parallel logical signals of, for example, 20 bits. The bit-parallel logical signals will hereafter be termed the numeric signals.

The input device still further comprises a data distributor 106 having an end-read, a D, an L, and an R lead on which the end-read signal eREAD, D, L, and R signals appear when the distributor 106 is supplied from the decoder 104 with the EOB, D, L, and R signals, respectively. The distributor 106 further has a first, a second, a third, and a fourth lead set 111, 112, 113, and 114, each set consisting of a sign lead and, for example, 20 bit leads. As is known in the art, the distributor 106 comprises AND gate circuit sets, four in number in the instant case, controlled by the set output of the respectively accompanying flip-flop circuit. When supplied with the D and the B signals from the decoder 104, the flip-flop circuits open those gate circuit sets which are coupled with the second and the fourth lead sets 112 and 114. Thus, the sign and the numeric signals derived from the sign and the numeric symbols recorded on the tape 100 following the data symbol B are simultaneously supplied to these lead sets 112 and 114 in bit-parallel pure binary form. When supplied with the D and the B signals, the flip-flop circuits cause the sign and the numeric signals to appear on the first lead set 111 with the sign signal inverted by an inverter (not shown) before application to the pertinent gate circuit set and cause the sign and the numeric signals to appear on the third lead set 113 as they stand. When supplied with the L or R signal and subsequently with the X, Y, A, and B signals one at a time, the flip-flop circuits open the gate circuit sets coupled with the first through the fourth lead sets 111, 112, 113, and 114, respectively. Thus, the sign and the numeric signals derived from the corresponding symbols following the data signals X, Y, A, and B are supplied to the lead sets 111, 112, 113, and 114, respectively.

The interpolator comprises a first section B-1 for primarily storing from time to time the information relating to the coordinate components of the start point, and the successive followup point. The first section B-1 comprises a register REG$p$ which in turn comprises three flip-flop circuits to be set by the D, L, and R signals supplied from the data distributor 106, respectively, and reset by the reset or clear signal to be later described. The first section B-1 further comprises a first through a fourth accumulator ACC1, ACC2, ACC3, and ACC4 which each may be the accumulator described in "-Computer Handbook," edited by Harry D. Huskey and Granino A. Korn and published, 1962, by McGraw-Hill, section 15, page 17, although the number of bits may differ according to the circumstances.

The accumulators ACC1, ACC2, ACC3, and ACC4 are supplied with the signals on the first through the fourth lead sets 111, 112, 113, and 114, respectively. The first accumulator ACC1 is adapted to receive the add and the subtract commands A–A$_1$ and S–A$_1$ produced in the manner later described. When the add command A–A$_1$ appears, the accumulator ACC1 is put into the additive state where the binary signals supplied to its input are added to its binary content. When the subtract command S–A$_1$ is produced, the accumulator ACC1 is put into the subtractive state where the signal applied to its input is subtracted from its content. The contents of the first accumulator ACC1 is reset to the all logical 0 state when the reset signal appears. The second through the fourth accumulators ACC2, ACC3, and ACC4 are supplied with similar commands A–A$_2$ and S–A$_2$, A–A$_3$ and S–A$_3$, and A–A$_4$ and S–A$_4$, respectively, and with the reset signal.

The first section B-1 still further comprises an all-zero AND-gate 116 supplied with the contents of the third and the fourth accumulators ACC3 and ACC4 for producing logical 1 signal when all bits of such contents are logical 0, and for producing logical 0 signal in other cases. As will become clear later, the gate 116 produces a logical 1 signal whenever the interpolation has been carried out to the end point of each curve block. The logical 1 signal serves as the begin-read signal bREAD, and makes a reset circuit RE produce the reset signal, which is supplied to the register and the accumulators REG$p$, ACC1, ACC2, ACC3, and ACC4 through connections not shown. The reset circuit RE may be a one-shot multivibrator.

Figure 10:
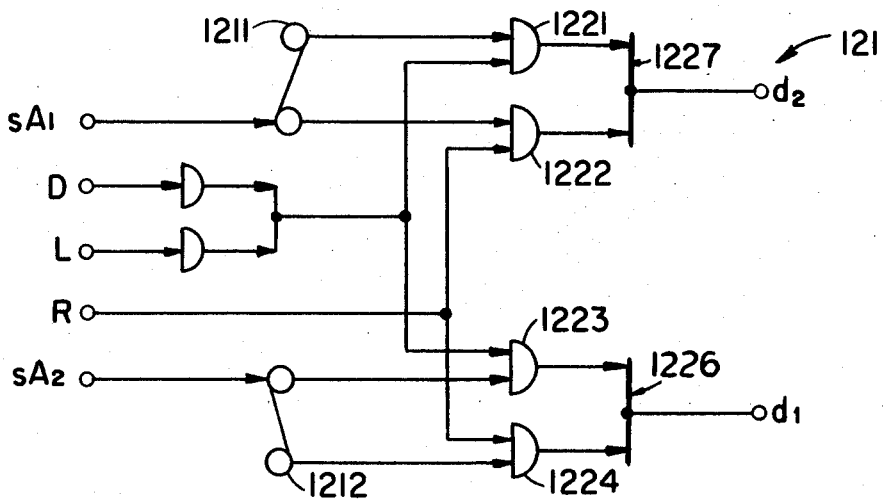
FIGS. 10 through 17 are circuit diagrams of some portions of the embodiment.

The interpolator further comprises a second section B-2 for determining the permissible directions and, for comparing the magnitudes of deviations of the possible followup points ($x_{i+1}$, $y_j$) and ($x_i$, $Y_{j+1}$) from the curve. The second section B-2 comprises a permissible direction finder 121 which in turn comprises, as shown more fully in FIG. 10, inverters 1211 and 1212 which are supplied with the sign signals $sA_1$ and $sA_2$ which are the signs of the respective components of the normal vector, as will become clear later, at the present followup point and are stored at the most significant digits in the first and the second accumulators ACC1 and ACC2, respectively. The direction finder 121 further comprises a first AND-gate 1221 which is supplied with the D- or L-signal registered in the register REG$p$ and with the inverted output of the first inverter 1211. The direction finder 121 still further comprises a second through a fourth AND-gate 1222, 1223, and 1224 connected as illustrated. The output $d_1$ of an $x$ OR-gate 1226 is logic 1 either when the D- or L-signal and the sign signal $sA_2$ are logic 1 or when the R-signal and the sign signal $sA_2$ are logic 0. The output $d_2$ of a $y$ OR-gate 1227 is logic 1 either when the D- or L-signal is logic 1 and the sign signal $sA_1$ is logic 0 or when the R-signal and the sign signal $sA_1$ are logic 1. These sense signals $d_1$ and $d_2$ determine the permissible directions as has already been illustrated with reference to FIG. 6. Incidentally, the $x$ and the $y$ sense signals $d_1$ and $d_2$ trigger an $x$ and a $y$ two-bit shift register REG$x$ and REG$y$. The second bit of the $x$ register REG$x$, for example, produces the $x$ sense signal $d_1$ ($x_i$, $y_j$) when the first bit is supplied with a new $x$ sense signal $d_1$ ($x_{i+1}$, $y_j$).

Figure 11:
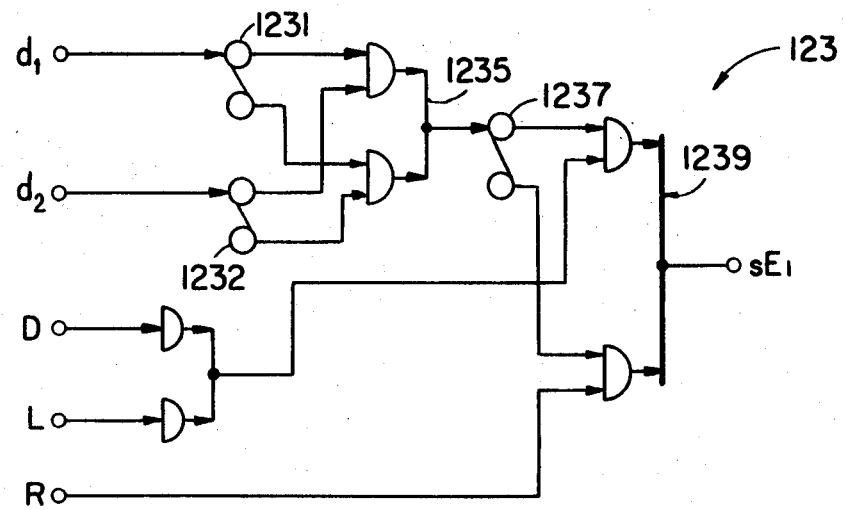

The second section B-2 further comprises a first sign finder 123 which carries out, together with the direction finder 121, the logic operation for equations (15) and (17). Referring to FIGS. 9 and 11, the sign finder 123 comprises inverters 1231 and 1232 supplied with the $x$ and the $y$ sense signals $d_1$ and $d_2$, respectively, a first AND- and OR-gate assembly 1235 supplied with the outputs of the inverters 1231 and 1232 for producing a logic 1 output when the $x$ and the $y$ sense signals $d_1$ and $d_2$ are both logic 1 or both logic 0, another inverter 1237 supplied with the output of the gate assembly 1235, and a second AND- and OR-gate assembly 1239 connected as shown for producing a logic 1 signal either when the D- or the L-signal is logic 1 and the $x$ and the $y$ sense signals $d_1$ and $d_2$ are both logic 1 or both logic 0, or when the R-signal is logic 1 and only one of the $x$ and the $y$ sense signals $d_1$ and $d_2$ is logic 1. The second gate assembly 1239 produces a logic 0 signal in other cases. This output is the sign signal $sE_1$ of the factor $E_1$ of the right-hand side of equation (12).

Figure 12:
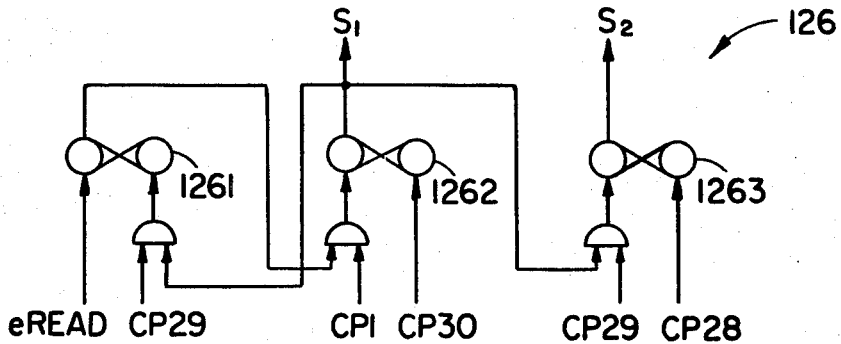

The interpolator still further comprises a third section B-3 for renewing the data stored in the first section B-1 as the followup proceeds. The third section B-3 comprises a clock-pulse generator (not shown) and an initial value-setting device 126, illustrated in detail in FIG. 12, which in turn comprises a first, a second, and a third flip-flop 1261, 1262, and 1263. It should be recalled that the end-read signal eREAD becomes logic 1 each times the end of block symbol EOB is sensed by the tape reader 102. The signal eREAD triggers the first flip-flop 1261, which in turn triggers the second flip-flop 1262 to produce a logic 1 first setting signal $S_1$ as soon as the first clock pulse CP1 appears following the trigger of the first flip-flop 1261. The first setting signal $S_1$ resets the first flip-flop 1261 and triggers the third flip-flop 1263 to produce the second setting signal $S_2$ when the 29th clock pulse CP29 appears. Incidentally, 30-phase clock pulses CP1, CP2,...,and CP30 are used here only by way of example. The time of occurrence of the first clock pulse CP1, the interval between the successive first clock pulses CP1, and the number of clock pulses to be placed between the adjacent first clock pulses CP1 are not material. Alternatively, the device 126 may comprise only two monostable multivibrators, the first being triggered by the end-read signal eREAD to produce the first setting signal $S_1$, the second being triggered to produce the second setting signal $S_2$ when the first monostable multivibrator returns to the reset state.

It is now presumed that each set of the signals on the lead sets 111, 112, 113, and 114 consists of 21 bits. The outputs of the first accumulator ACC1 consequently consist of 21 bits, which are now denoted by $sA_1$ (as before), $a_{1+20}, a_{1-19},...,a_{1-2}$, and $a_{1-1}$. Similarly, the outputs of the second accumulator ACC2 are $sA_2, a_{2-20}, a_{2-19},...,a_{2-2}$, and $a_{2-1}$.

Figure 13:
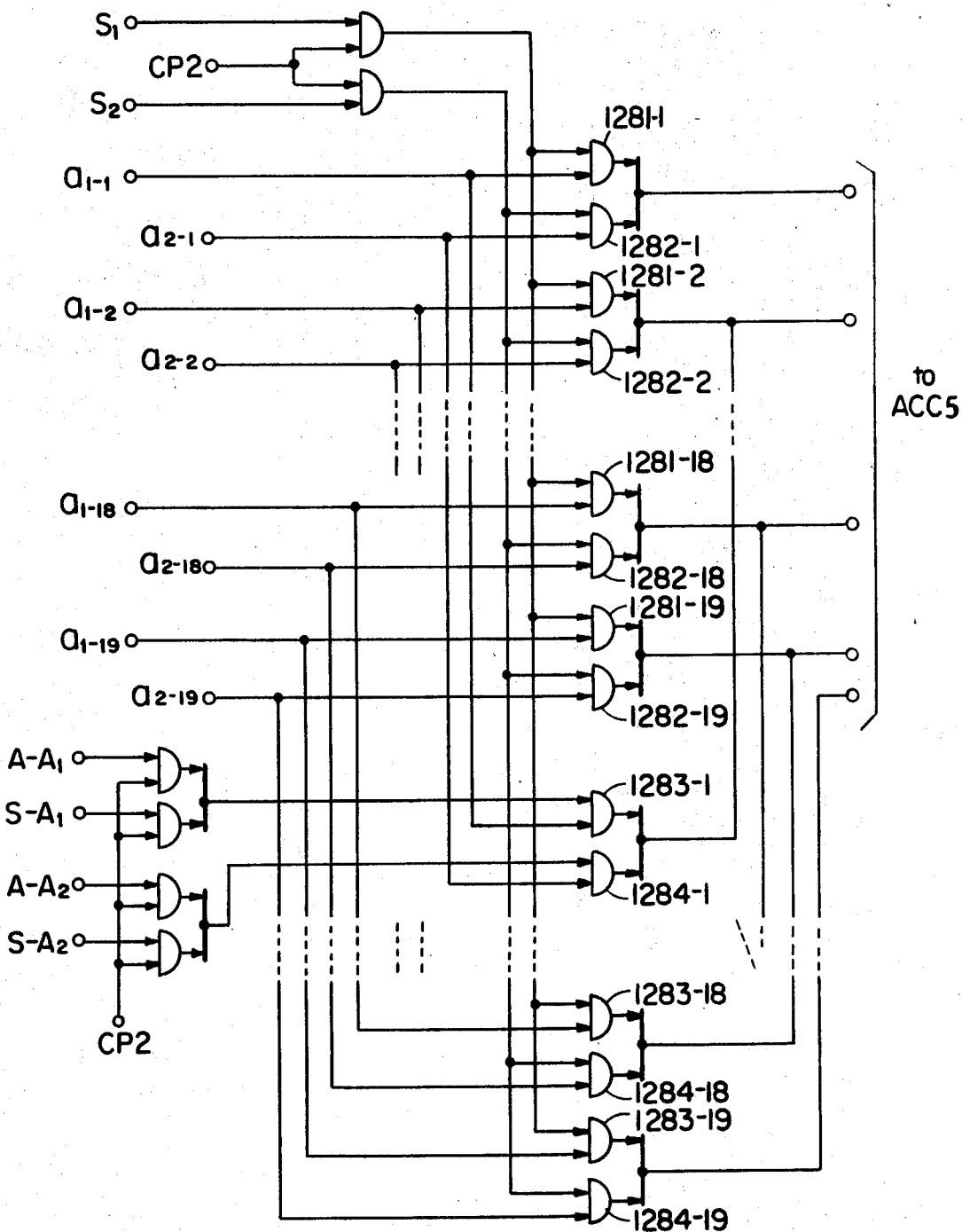

The third section B-3 further comprises a transfer gate device 128 depicted in detail in FIG. 13 which comprises in turn a first plurality of AND-gates 1281-1, 1281-2,...,and 1281-19 supplied, in the manner shown, with the output of the first accumulator ACC1 except the sign bit $sA_1$ and, at the time of the second clock pulse CP2, with the first setting signal $S_1$. That most significant digit or 20th bit of the numeric signal of the accumulator which is logic 0 in the case being considered need not be supplied to the device 128, because such bit is used in order merely to use the accumulators of the same constructions as the accumulators ACC1 through ACC4 as well as the fifth accumulator ACC5 described later. The device 128 further comprises a second plurality of AND-gates 1282-1, 1282-2,...,and 1282-19 connected in the manner illustrated to receive the output of the second accumulator ACC2 except the sign bit $sA_2$ and, at the CP2 clock-pulse time point, the second setting signal $S_2$. The device 128 still further comprises a third plurality of AND-gates 1283-1, 1283-2,...,and 1283-19 and a fourth plurality of AND-gates 1284-1, 1284-2,..., and 1284-19 connected as shown to receive the pertinent outputs of the first and the second accumulators ACC1 and ACC2 and, at the time of the second clock pulse CP2, one of the add and the subtract commands for accumulators ACC1 and ACC2. The device 128 therefore transfers therethrough the $a'$ or $x_b$ signal at the CP2 clock-pulse time point after the occurrence of the first setting signal $S_1$ and then the $b$ or $y_b$ signal at the next CP2 clock-pulse time point. Subsequently, the device 128 transfers the pertinent content of the first or the second accumulator ACC1 or ACC2 whenever the content is renewed by the add or the subtract command in the manner later described.

Figure 14:
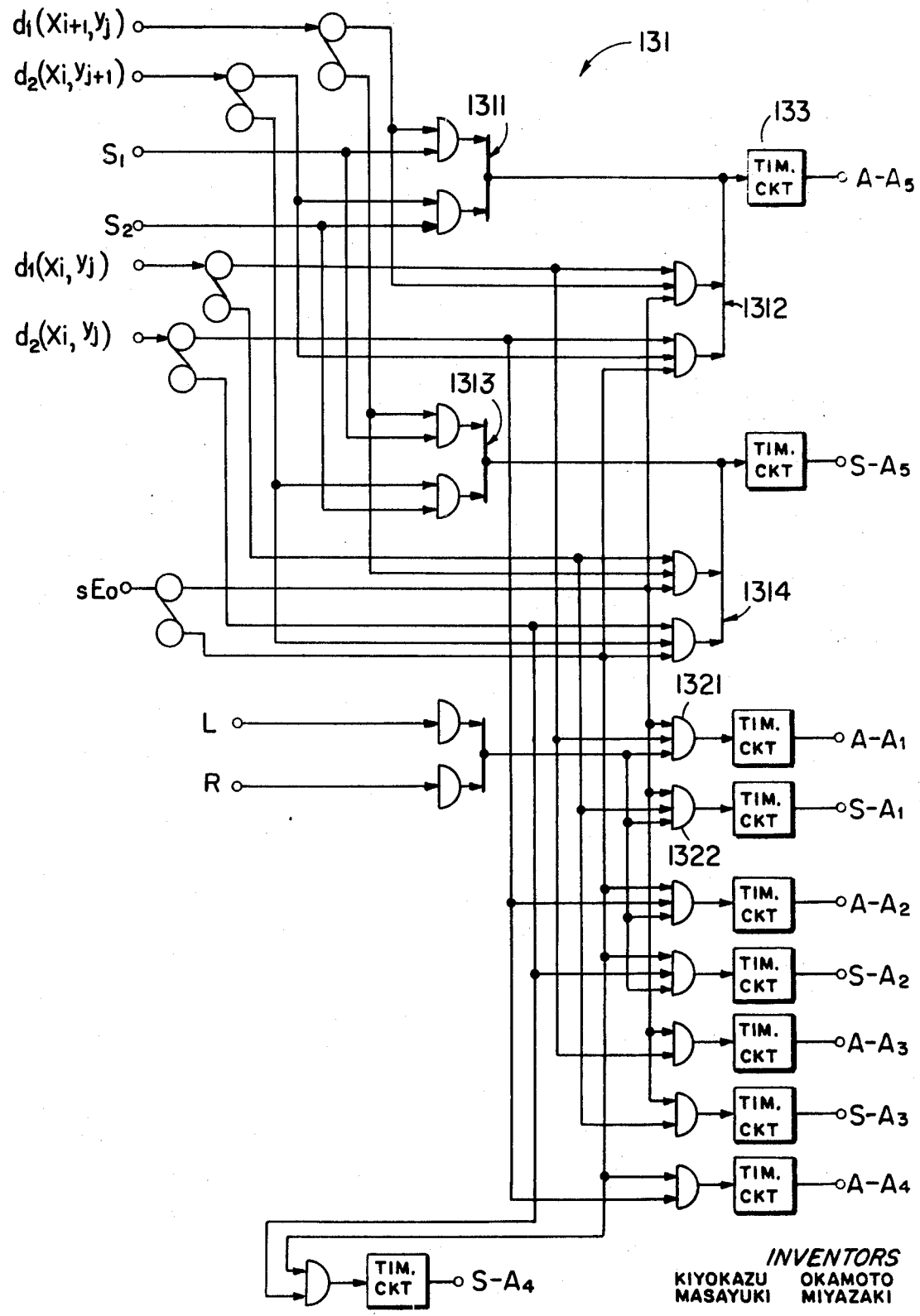

The third section B-3 still further comprises a command generator 131 which in turn comprises, as illustrated in detail in FIG. 14, a first AND/OR-gate assembly 1311 which derives a logic 1 add command $A-A_5$ for the fifth accumulator ACC5 either when the $x$ sense and the first setting signals $d_1$ and $S_1$ are both logic 1 or when the $y$ sense and the second setting signals $d_2$ and $S_2$ are both logic 1. The generator 131 further comprises a second AND/OR-gate assembly 1312 which delivers another logic 1 fifth accumulator add command $A-A_5$ either when the $x$ sense signals at a particular time $d_1$ $(x_{i+1}, y_j)$ and at the previous time $d_1$ $(x_i, y_j)$ and that overall sign signal $sE_o$ for $E_0$ given by equation (11) which is produced in the manner later described are all logic 1, or when the $y$ sense signals at a given time $d_2$ $(x_i, y_{j+1})$ and at the next preceding time $d_2$ $(x_i, y_j)$ are logic 1 and the overall sign signal $sE_0$ is logic 0. The generator 131 still further comprises a third AND/OR-gate assembly 1313 for producing a logic 1 fifth accumulator subtract command $S-A_5$ either when the $x$ sense signal $d_1$ and the first setting signal $S_1$ are logic 0 and 1, respectively, or when the $y$ sense signal $d_2$ and the second setting signal $S_2$ are logic 0 and 1, respectively. The generator 131 yet further comprises a fourth AND/OR-gate assembly 1314 which supplies a logic 1 fifth accumulator subtract command $S-A_5$ either when two successive $x$ sense signals $d_1$ $(x_i, y_j)$ and $d_1$ $(x_{i+a}, y_j)$ and the overall sign signal $sE_0$ are logic 0 and 1, respectively, or when two successive $y$ sense signals $d_2$ $(x_i, y_j)$ and $d_2$ $(x_i, y_{j+1})$ and the overall sign signal $sE_0$ are all logic 0. The generator 131 further has a first AND-gate 1321 for deriving a logic 1 add command $-A_1$ for the first accumulator ACC1 when the overall sign signals $SE_0$, the $x$ sense signal $d_1$ and the L- or R-signal are logic 1. The generator 131 further comprises a second AND-gate 1322 for delivering a logic 1 first accumulator subtract command $S-A_1$ when the overall sign signal $SE_0$, the $x$ sense signal $d_1$ and the L- or R-signal are logic, 0, and 1, respectively. The generator 131 still further comprises similar AND gates for the second, the third, and the fourth accumulator add and subtract commands. It is to be noted here that each of these commands is delivered to the pertinent accumulator and elsewhere through a timing circuit, such as 133, which is exactly identical in circuit with the initial value-setting device 126 excepting the third flip-flop 1263, the end-read signal eREAD and the first setting signal $S_1$ substituting the outputs of the AND/OR-gate assemblies 1311 and 1312 and others.

The first section B-1 comprises a fifth accumulator ACC5, which is of the same construction as the other accumulators in this specific embodiment and is reset by the reset signal supplied thereto through a connection not shown, although the first through the fourth accumulators ACC1 through ACC4 may each be a counter because the content at only the least significant digit is subject to change in compliance with the add and the subtract commands. The second clock pulse CP2 appearing during the presence of the commands $A-A_5$ and/or $S-A_5$ produced by the first and the second setting signals $S_1$ and $S_2$ makes the transfer gate device 128 transfer the content of the first or the second accumulator ACC1 or ACC2 to the fifth accumulator ACC5 at the bit positions, each shifted by one bit towards the less significant digit. Consequently, the accumulator ACC5 stores the initial value $E_2(0, 0)$ or $E_2'(x_b, y_b)$ given by equation (16') or (18').

Figure 15:
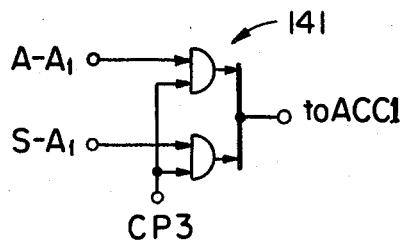

The third section comprises a first through a fourth gate device 141, 142, 143, and 144 of the common construction shown in FIG. 15. When supplied with a logic 1 add or subtract command, the gate device supplies a logic 1 signal to the least significant digit of that one of the first through the fourth accumulators ACC1 through ACC4 at the time of the third clock pulse CP3 which is put into the state of addition or subtraction by the pertinent command. For example, the first accumulator add command $A-A_1$ adds a logic 1 to the content of the first accumulator ACC1 when the curve is a circular arc and the step of followup has proceeded towards the $+x$ direction. Thus, the contents of the first and the second accumulators ACC1 and ACC2 are not renewed when the curve being contoured is a straight line segment but are rewritten from $x_i$ to $x_{i+1}$ and from $y_j$ to $y_{j+1}$ by the pertinent commands when a circular arc is followed up. As for the third and the fourth accumulators ACC3 and ACC4, the contents are changed by the commands towards nil irrespective of the kind of the curve being traced.

The fifth accumulator ACC5, after put into the state of addition or subtraction by the subsequent add or subtract command $A-A_5$ or $S-A_5$ produced by the logic operation of the overall sign signal $sE_0$ and the sense signals $d_1[x_1,y_j)$, $d_1(x_{i+1}, y_j)$, $d_2(x_i, y_j)$, and $d_2(x_{ia}, y_{j+1})$, receives the content of the first or the second accumulator ACC1 or ACC2 renewed in compliance with that command for the first or the second accumulator which opens the transfer gate device 128. Thus, the content of the fifth accumulator ACC5 is successively changed according to equations (21) and (22) to become the factor $E_2$ in equation (16) or according to equations (19) and (20) to become the factor $E_2'$ given by equation (18). Inasmuch as only the sign is required for the last factor $E_2$ of the right-hand side of equation (12), use is made only of the sign bit of the content of the fifth accumulator ACC5.

Figure 16:
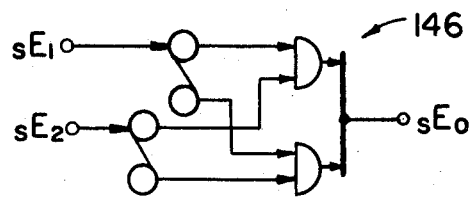

The second section B-2 comprises a minimum deviation finder 146 supplied with the first and the second sign signals $sE_1$ and $sE_2$ for producing the logic 1 or 0 overall sign signal $sE_0$ as shown in FIG. 16, according to equation (12).

Figure 17:
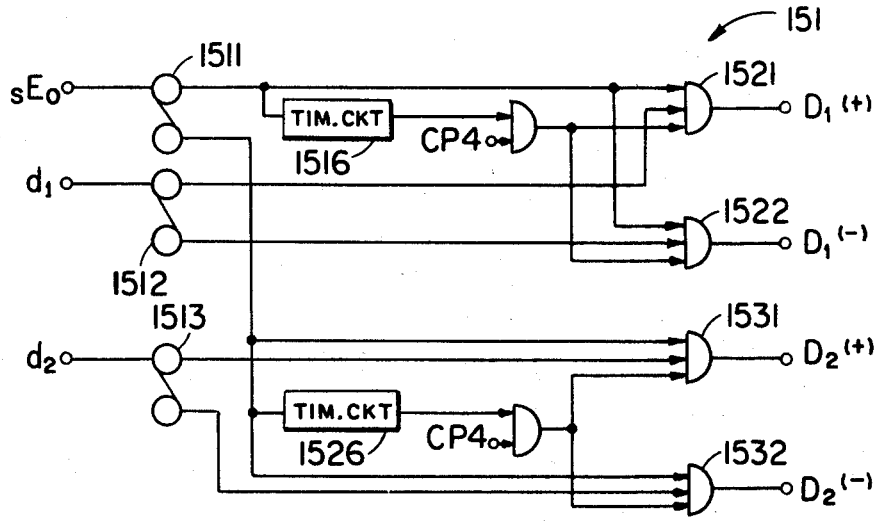

The interpolator has an output producing section consisting of an output gate device 151 described in detail in FIG. 17. The device 151 comprises a sign, an $x$, and a $y$ inverter 1511, 1512, and 1513 supplied with the overall sign signal $sE_0$ and the sense signals $d_1$ and $d_2$, respectively. The device 151 further comprises an $x$ timing circuit 1516 which is similar in construction to the timing circuit 133 shown in FIG. 14 and which supplies a logic 1 signal to a $+x$ and a $-x$ increment AND-gate 1521 and 1522 when the fourth clock pulse CP4 appears after the conversion of the overall sign signal $sE_0$ to logic 1. Similarly, a $y$ timing circuit 1526 supplies a logic 1 signal to a $+y$ and a $-y$ increment AND-gate 1531 and 1532 when the fourth clock pulse CP4 appears after the conversion of the overall sign signal $sE_0$ to logic 0. When the overall sign signal $sE_0$ is logic 1, the $+x$ and the $-x$ increment AND-gates 1251 and 1252 supplies a logic 1 $+x$ and $-x$ increment signal $D_1(+)$ and $D_1(-)$ according as the $x$ sense signal $d_1$ is logic 1 and 0, respectively. When the overall sign signal $sE_0$ is logic 0, the logic 1 1 $+y$ and $-y$ increment signal $D_2(+)$ and $D_2(-)$ are obtained when the $y$ sense signal $d_2$ is logic 1 and 0, respectively.

The output $D_1(+)$, $D_1(-)$, $D_2(+)$, or $D_2(-)$ of the interpolator is supplied to a utilization unit 159, such as a digital servosystem or a magnetic, electrostatic, or other recorder.

Figure 18:
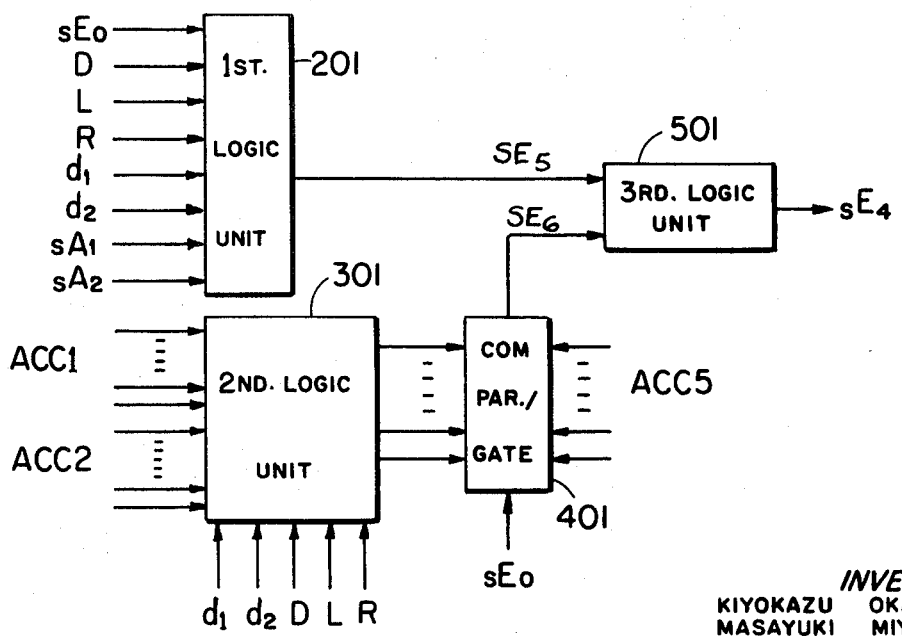
FIG. 18 is a partial schematic diagram of another embodiment of the invention.

Referring now to FIG. 18, an interpolator with three-step directions is of the similar construction to that illustrated with reference to FIG. 9 except for the additional components shown in this drawing. As mentioned with reference to FIG. 4, it is necessary to determine which is the minimum of the deviations $L_n$, $l_n$, and $\lambda n$. At first, the incremental signal $D_1(+)$, $D_1(-)$, $D_2(+)$, or $D_2(-)$ is derived by the interpolator shown in FIG. 9 after a comparison of the former two deviations $L_n$ and $l_n$. The incremental signal is temporarily stored in the registers (not shown) specifically installed in the instant case in the output gate device 151. The further process is to compare the remaining deviation with the lesser of the first two deviations.

Let a binary function be denoted $E_0(+)$, which is logic 1 and 0 when $sE_0$ is plus and otherwise, respectively, and another function be denoted $E_0(-)$, which gives logic 1 and 0 when $sE_0$ is minus and otherwise, respectively. It is now possible to determine the least one of the three deviations by checking the sign of $E_4$ given by $$E_4 = E_0(+) \cdot \{|f(x_{i+1}, y_{j+1})|^2 - |f(x_{i+1}, y_j)|^2\}$$
$$+ E_0(-) \cdot \{|f(x_{i+1}, y_{j+1})|^2 - |f(x_i, y_{j+1})|^2\} \equiv 4E_5 \cdot E_6 \quad (23)$$

where $$E_5 = 1/2 \cdot E_0(+) \cdot \{f(x_{i+1}, y_{j+1}) - f(x_{i+1}, y_j)\}$$
$$+ 1/2 \cdot E_0(-) \cdot \{f(x_{i+1}, y_{j+1}) - f(x_i, y_{j+1})\}$$
$$= D\Lambda \{E_0(+) \cdot b/2 \cdot d_2(x_{i+1}, y_j) V E_0(-) \cdot a'/2 \cdot d_1(x_i, y_{j+1})\}$$
$$V(LVR)\Lambda\{E_0(+) \cdot y_j d_2(x_{i+1}, y_j) V E_0(-)$$
$$\cdot x_i d_1(x_i, y_{j+1}) + 1/2\} \quad (24)$$

and $$E_6 = 1/2 \cdot E_0(+) \{f(x_{i+1}, y_{j+1}) + f(x_{i+1}, y_j)\}$$
$$+ 1/2 \cdot E_0(-) \cdot \{f(x_{i+1}, y_{j+1}) + f(x_i, y_{j+1})\}$$
$$= E_0(+) \cdot [E_2(x_{i+1}, y_j) - 1/2 \cdot \{f(x_{i+2}, y_j)$$
$$- f(x_{i+1}, y_j)\}] + E_0(-) \cdot [E_2(x_i, y_{j+1})$$
$$- 1/2 \cdot \{f(x_i, y_j+2) - f(x_i, y_{j+1})\}] \quad (25)$$

As regards Equation (25), $$1/2 \cdot \{f(x_{i+2}, y_j) - f(x_{i+1}, y_j)\} = D\Lambda\{a'/2 \cdot d_1(x_{i+1}, y_j)\}$$
$$V(LVR)\Lambda\{x_{i+1} \cdot d_1(x_{i+1}, y_j) + 1/2\} \quad (26)$$

and $$1/2 \cdot \{f(x_i, y_{j+2}) - f(x_i, y_{j+1})\} - D\Lambda\{b/2 \cdot d_2(x_i, y_{j+1})\}$$
$$V(LVR)\Lambda\{y_{j+1} \cdot d_2(x_i, y_{j+1}) + 1/2\} \quad (27)$$

Inasmuch as only the signs of $E_5$ and $E_6$ are necessary, the sign bit outputs from the first and the second accumulators ACC1 and ACC2 can be used in lieu of $a'/2$ or $x_i$ and $b/2$ or $y_j$, respectively. Also, the term 1/2 in the braces may be left out of consideration, because such is less than a quantization unit.

In FIG. 18, a first logic unit 201 performs the operations for the logical equation (24) to derive the logic 1 or 0 signal $sE_5$ representing the sign $sE_5$ of the factor $E_5$. As would have become clear through detailed drawings for the embodiment of FIG. 9, the unit 161 comprises an inverter for the overall sign signal $sE_0$, a first AND gate for the noninverted $sE_0$ signal and the signals $sA_2$ and $d_2$, a second AND gate for the inverted $sE_0$ signal and the signals $sA_1$ and $d_1$, a first OR gate for the outputs of the first and the second AND gates, a third AND gate for the signal D and the output of the first OR gate, a fourth AND gate for the noninverted $sE_0$ signal and the signals $sA_2$ and $d_1$, a fifth AND gate for the inverted $sE_0$ signal and the signals $sA_1$ and $d_1$, a second OR gate for the signals L and R, a third OR gate for the outputs of the fourth and the fifth AND gates, a sixth AND gate for the outputs of the second and the third OR gates, and a fourth OR gate for the third and the sixth AND gates. A second logic unit 301 carries out the calculation of equations (26) and (27) for the signals D, L, R, $d_1$, and $d_2$ and the contents $a'$ or $x_{i+1}$ and $b$ or $y_{j+1}$ of the first and the second accumulators ACC1 and ACC2 to derive the left-hand side of these equations. The detail of the unit 301 may now be clear to those skilled in the art from the foregoing description of FIGS. 9 and 18. A comparator/gate circuit 401 produces a logic 1 and 0 sign signal $sE_6$ by comparing the output $f(x_{i+2}, y_j) - f(x_{i+1}, y_j)$ and $f(x_i, y_{j+2}) - f(x_i, y_{j+1})$ of the second logic unit 301 with the content $E_2(x_{i+1}, y_j)$ and $E_2(x_i, y_{j+1})$ of the fifth accumulator ACC5, respectively, and by carrying out the logic operation defined by equation (25). The gate circuit portion for calculation comprises a first AND gate for the overall sign signal $sE_0$ and the comparator output, a second AND gate for the inverted overall sign signal and the comparator output, and an Or gate for the outputs of these AND gates. A third logic unit 501 of the construction shown in FIG. 16 produces the desired signal $sE_4$.

It is seen from equation (23) that when the desired sign signal $sE_4$ is logic 1, the lesser of the deviations $L_n$ and $l_n$ is the minimum of the three deviations. When the last factor $E_6$ is found to be zero by the comparator/gate circuit 401, it is convenient to deem the lesser as the least. In either case, the contents of the registers in the output gate device 151 are therefore the eventual output of the interpolator. When the desired sign signal $sE_4$ is logic 0, the followup should proceed along the diagonal. Considering with reference to FIG. 4 the followup from the present followup point to the temporarily determined next followup point and that from the latter to the ultimately determined next followup point, it is seen that the temporarily determined incremental signal $D_1(+)$, $D_1(-)$, $D_2(+)$, or $D_2(-)$ should be supplemented with another incremental signal. The signal to be added is in the direction of the y-axis when the temporary incremental signal is in the direction of the x-axis and vice versa. It is now necessary again to put the command generator 131 into operation and to make the interpolator perform the subsequent operation. The command generator 131 is therefore provided, at the place of the inverter (FIG. 14) supplied with the sign signal $sE_0$, with a logic circuit for performing the logic operation given by the following equations (28):

and
$$(sE_0 = +1) V \{(sE_0 = -1) \wedge (sE_4 = -1)\}$$
$$(sE_0 = -1) V \{(sE_0 = +1) \wedge (sE_4 = -1)\} \quad (28)$$

With this repeated operation of the interpolator, the incremental signal to be added is obtained at one of the $+x$, the $-x$, the $+y$, and the $-y$ incremental AND-gates 1521, 1522, 1531, and 1532. This incremental signal and the temporarily registered incremental signal are now utilized in the utilization device 159. In any case, the registers in the output gate device 151 are reset after the interpolator has derived the ultimate incremental signal or signals.

While the deviations are compared in the embodiments of FIGS. 9 and 18 by equation (11) and equations (11) and (23), respectively, it is possible to generate electric signals representing the absolute values of the deviations by accumulators and gates and to compare the signals by comparators to determine the incremental signal or signals.

Figure 19:
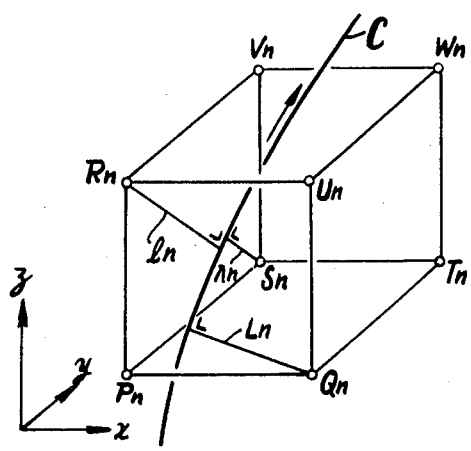
FIG. 19 shows the principle of the invention for a three dimensional curve.

Referring finally to FIG. 19, the principles of this invention are applicable to tracing a three-dimensional curve C in the sense shown by the arrow. In case the permissible directions from a present followup point $\rho_N$ are the $+x$, the $+y$, and the $+z$ directions, the next possible followup points are $Q_N$, $R_N$, and $S_N$. The actual next followup point is one of such points, for which the deviation is the minimum of the three deviations $L_N$, $l_N$, and $\lambda_N$. In case the diagonals are also taken into consideration, it is only necessary to find, instead of the minimum of three deviations, the minimum of seven deviations of the points $Q_N$, $R_N$, $S_N$, $T_N$, $U_N$, $V_N$, and $W_N$ from the desired curve. Alternatively, the interpolation may be applied to the projections of the desired curve on the yz, the zx, and the xy planes to determine the three-dimensional coordinates of the next followup point.

What is claimed is:

1. In a digital interpolator for successively deriving from information defining a curve to be followed up, the coordinates of the actual followup points for said curve being defined by an equation $f(x, y)=0$ (where x and y are variables), said curve being replaceable with at least one replacement segment with sufficient precision, said segment being one of a circular arc and a straight line segment, said followup point being selected from at least the two next possible followup points existing near the present followup point, the improvement which comprises: means responsive to data defining said replacement segment for deriving a least deviation signal determined by the least one of the absolute values of $f(x, y)$ with the variables being substituted with the coordinates of said possible followup points, and means responsive to said least deviation signal for successively deriving said coordinates of said actual followup points.

2. The interpolator according to claim 1, wherein said data consists of information defining the kind of said replacement segment and the sense of followup, and the information representing the coordinates of the start and end points of followup.

3. The interpolator according to claim 1, wherein said coordinates are quantized coordinates, and wherein at least two of said possible followup points for said reference followup point each have coordinates differing by one quantization unit from the corresponding one of the coordinates of said reference followup point.

4. The interpolator according to claim 1, wherein said least deviation-signal-deriving means comprises means responsive to said data for deriving sense signals representative of the permissible directions into which the next subsequent step of followup should proceed, and means responsive to said data and said sense signals for producing said least deviation signal.

5. The interpolator according to claim 4, wherein said coordinate deriving means comprises means responsive to said least deviation signal and said sense signals for producing an incremental signal representative of an increment which, when algebraically added to the coordinates of said reference followup point, provides the coordinates of the next actual followup point.

6. A digital interpolator for a curve to be traced, said curve being defined by an equation $f(x, y)=0$ where x and y are variables, said interpolator comprising means for storing first information defining the kind of said curve the curve followup direction, and the start and end points having quantized coordinates and second information corresponding to a reference followup point, means coupled to said storing means for determining the permissible directions of a plurality of possible followup points adjacent to said reference followup point, means coupled to said storing means and said determining means for comparing the absolute values of $f(x, y)$ with the variables being substituted with the coordinates of said possible followup points, means coupled to said storing means, said determining means, and said comparing means for converting said second information into information corresponding to that one of said possible followup points for which the absolute value is a minimum, and an output device coupled to said determining means and said comparing means for deriving information indicating changes in the position of said one of said followup points.

7. In a digital interpolator for successively deriving the coordinates of actual followup points for a curve to be followed up from a small amount of information defining said curve, said curve being defined by the equation $f(x, y)$ where x and y are variables, said curve being replaceable with at least one replacement segment with sufficient precision, said segment being one of a circular arc and a straight line segment, each of said followup points being selected from at least the two next possible followup points located near the present followup point, the improvement which comprises: first means responsive to the data defining said replacement segment for deriving a sign signal representative of the sign of $|f(x_1, y_1)|^2 - |f(x_2, y_2)|^2$, where $(x_1, y_1)$ and $(x_2, y_2)$ are the coordinates of two of the possible followup points for the present followup point, and second means responsive to said sign signal for deriving an incremental signal representative of an increment which provides the actual direction of the next subsequent followup and which, when algebraically added to the coordinates of the present followup point, provides the coordinates of the next actual followup point.

8. The interpolator according to claim 7, wherein said first means comprises first and second accumulator means responsive to said data and said sign signal for storing the x and y coordinates of the present followup point, and for producing the x and y signals representative of said x and y coordinates, respectively, third means responsive to said data and said x and y signals for producing sense signals representative of the senses of the x and y coordinate axes in which the next subsequent step of followup should proceed, third accumulator means responsive to said data, said sign signal, the x and y signals, and said sense signals for storing the algebraic sum of the present store plus the x and y signals when said actual direction is in the y and x directions, respectively, and for deriving a second sign signal representative of the sign of the store, and fourth means responsive to said data, said sense signals, and said second sign signal for deriving said first-mentioned sign signal.

9. The interpolator according to claim 7, wherein said first deriving means comprises third means responsive to said data for deriving the sense signals representative of two of the permissible directions, said two directions being parallel with the coordinate axes, except for the senses, said permissible directions consisting of said two directions and a third direction extending along the diagonal determined by said two directions, one of said permissible directions giving the direction in which the next subsequent step of followup should proceed, fourth means responsive to the derivation of the incremental signal for producing a first command signal, and fifth means responsive to said data, said sense signals, and said command signal for deriving a first sign signal representative of the sign of $|f(x_1, y_2)|^2 - |f(x_2, y_2)|^2$, where $(x_1, y_1)$ and $(y_1, y_2)$ are the coordinates of two of the possible followup points, said two possible followup points being spaced from the present followup point in said two permissible directions, respectively, and wherein said second deriving means comprises sixth means responsive to said sense signals and said first sign signal for producing a first incremental signal, and seventh means responsive to said incremental signal for temporarily storing the same, said fourth means being further responsive to said second sign signal for producing a second command signal, said fifth means being further responsive to said second command signal for deriving a zero signal when the sign of the differences $|f(x_3, y_3)|^2 - |f(x_1, y_1')|^2$ and $|f(x_3, y_3)|^2 - |f(x_2, y_2)|^2$ are both positive, where $(x_3, y_3)$ is the coordinates of a third possible followup point spaced from the present followup point in said two permissible directions, respectively, said second means comprising sixth means responsive to said sense signals and said first sign signal for producing a first incremental signal, and seventh means responsive to said incremental signal for temporarily storing said incremental signal, said fourth means being responsive to said second sign signal for producing a second command signal, said fifth means being responsive to said second command signal, for deriving a zero signal when the signs of the differences $|f(x_3, y_3)|^2 - |f(x_1, 1)|^2$ and $|f(x_3, y_3)|^2 - |f(x_2, y_2)|^2$ are both positive, where $(x_3, y_3)$ is the coordinates of a third possible followup point spaced from the present followup point.

\* \* \* \* \*

UNITED STATES PATENT OFFICE
CERTIFICATE OF CORRECTION

Patent No. 3,634,667    Dated January 11, 1972

Inventor(s) Kiyokazu Okamoto and Masayuki Miyazaki

It is certified that error appears in the above-identified patent and that said Letters Patent are hereby corrected as shown below:

<u>Column 13</u>, Claim 1, lines 49 & 57, the symbols "x" and "y" should have been underscored.

<u>Column 14</u>, Claim 6, lines 12 & 21, the symbols "x" and "y" should have been underscored.

Claim 7, lines 34, 43 & 44, the symbols "x" and "y" should have been underscored.

Claim 8, lines 54, 56-59, 61, 63 & 64, the symbols "x" and "y" should have been underscored.

<u>Column 15</u>, Claim 9, lines 6 & 7, the symbols "x" and "y" should have been underscored;

line 18, "$|f(x_3, y_3)|^2 - |f(x_1, y_1')|^2$" should have been -- $|f(\underline{x}_3, \underline{y}_3)|^2 - |f(\underline{x}_1, \underline{y}_1)|^2$ --.

<u>Column 16</u>, Claim 9, lines 1 & 14, the symbols "x" and "y" should have been underscored;

line 13, "$|f(x_3, y_3)|^2 - |f(x_1, 1)|^2$" should have been -- $|f(\underline{x}_3, \underline{y}_3)|^2 - |f(\underline{x}_1, \underline{y}_1)|^2$ --.

Signed and sealed this 1st day of August 1972.

(SEAL)
Attest:

EDWARD M. FLETCHER, JR.        ROBERT GOTTSCHALK
Attesting Officer              Commissioner of Patents